(12) United States Patent
Zhuang et al.

(10) Patent No.: US 12,715,448 B2
(45) Date of Patent: Aug. 25, 2026

(54) INSTANTANEOUS PERCEPTION OF FINE-GRAINED 3D MOTION

(71) Applicant: NEC Laboratories America, Inc., Princeton, NJ (US)

(72) Inventors: Bingbing Zhuang, Santa Clara, CA (US); Manmohan Chandraker, Santa Clara, CA (US); Di Liu, Piscataway, NJ (US)

(73) Assignee: NEC Corporation, Tokyo (JP)

(*) Notice: Subject to any disclaimer, the term of this patent is extended or adjusted under 35 U.S.C. 154(b) by 60 days.

(21) Appl. No.: 18/903,538

(22) Filed: Oct. 1, 2024

(65) Prior Publication Data

US 2025/0115250 A1 Apr. 10, 2025

Related U.S. Application Data

(60) Provisional application No. 63/548,534, filed on Nov. 14, 2023, provisional application No. 63/542,608, filed on Oct. 5, 2023.

(51) Int. Cl.

| | |
|---|---|
| ***B60W 40/10*** | (2012.01) |
| ***B60W 10/18*** | (2012.01) |
| ***B60W 10/20*** | (2006.01) |
| ***G06T 3/18*** | (2024.01) |
| ***G06T 7/246*** | (2017.01) |

(52) U.S. Cl.

CPC ............ *B60W 40/10* (2013.01); *B60W 10/18* (2013.01); *B60W 10/20* (2013.01); *G06T 3/18* (2024.01); *G06T 7/251* (2017.01); *B60W 2420/408* (2024.01); *G06T 2207/10028* (2013.01)

(58) Field of Classification Search

CPC ...... B60W 40/10; B60W 10/18; B60W 10/20; B60W 2420/408; G06T 7/251; G06T 3/18; G06T 2207/10028

See application file for complete search history.

(56) References Cited

U.S. PATENT DOCUMENTS

| | | | | |
|---|---|---|---|---|
| 10,970,518 | B1 * | 4/2021 | Zhou | G06T 9/002 |
| 11,403,817 | B1 * | 8/2022 | Eckman | G06V 20/176 |
| 11,543,534 | B2 * | 1/2023 | Sun | G01S 17/894 |
| 12,466,437 | B2 * | 11/2025 | Phillips | G06V 10/764 |
| 2019/0108639 | A1 * | 4/2019 | Tchapmi | G06V 10/764 |
| 2020/0200912 | A1 * | 6/2020 | Chen | G06V 20/582 |
| 2020/0294257 | A1 * | 9/2020 | Yoo | G06N 3/084 |

(Continued)

OTHER PUBLICATIONS

Huang, S., Gojcic, Z., Huang, J., Wieser, A., & Schindler, K. (Oct. 23, 2022). Dynamic 3d scene analysis by point cloud accumulation. In European Conference on Computer Vision (pp. 674-690). Cham: Springer Nature Switzerland.

(Continued)

*Primary Examiner* — Ramsey Refai

(74) *Attorney, Agent, or Firm* — Vincent Duffy

(57) ABSTRACT

Methods and systems for motion detection include performing a first prediction to predict voxel occupancy based on a sequence of input point clouds including a current point cloud and a set of previous point clouds. A second prediction is performed to predict voxel occupancy for the sequence of input point clouds using predicted voxel occupancy between the input point clouds. Motion detection is performed based on the completed voxel occupancy. An action is performed responsive to a detected motion.

20 Claims, 7 Drawing Sheets

(56) References Cited

U.S. PATENT DOCUMENTS

| | | | | |
|---|---|---|---|---|
| 2021/0009166 | A1* | 1/2021 | Li | G06N 3/09 |
| 2021/0012555 | A1* | 1/2021 | Zhou | G06V 20/56 |
| 2021/0082181 | A1* | 3/2021 | Shi | G06V 10/764 |
| 2021/0146963 | A1* | 5/2021 | Li | G06N 3/09 |
| 2021/0150230 | A1* | 5/2021 | Smolyanskiy | G06V 10/803 |
| 2023/0196731 | A1* | 6/2023 | Agrawal | G06T 7/55 382/103 |

OTHER PUBLICATIONS

Khurana, T., Hu, P., Held, D., & Ramanan, D. (Jun. 18, 2023). Point cloud forecasting as a proxy for 4d occupancy forecasting. In Proceedings of the IEEE/CVF Conference on Computer Vision and Pattern Recognition (pp. 1116-1124).

Li, X., Zheng, J., Ferroni, F., Pontes, J. K., & Lucey, S. (Oct. 2, 2023). Fast neural scene flow. In Proceedings of the IEEE/CVF International Conference on Computer Vision (pp. 9878-9890).

Zeng, W., Luo, W., Suo, S., Sadat, A., Yang, B., Casas, S., & Urtasun, R. (Jun. 16, 2019). End-to-end interpretable neural motion planner. In Proceedings of the IEEE/CVF Conference on Computer Vision and Pattern Recognition (pp. 8660-8669).

* cited by examiner

INSTANTANEOUS PERCEPTION OF FINE-GRAINED 3D MOTION

RELATED APPLICATION INFORMATION

This application claims priority to U.S. Patent Application No. 63/542,608, filed on Oct. 5, 2023, and to U.S. Patent Application No. 63/548,534, filed on Nov. 14, 2023, each incorporated herein by reference in its entirety.

BACKGROUND

Technical Field

The present invention relates to motion detection and, more particularly, to detection of instantaneous motion.

Description of the Related Art

Detection of motion, particularly relatively small motions, is a challenge in analyzing traffic scenes, such as for autonomous vehicles. A traffic scene may include a number of moving or movable objects, such as vehicles, pedestrians, and cyclists. Third-party movement is therefore ubiquitous in realistic driving scenarios, and detecting such motion is important for safe operation. Movement of objects within a scene can cause collisions or accidents if the autonomous vehicle does not account for it.

While large motions are relatively easy to identify, fine-grained small motion can be difficult to detect in an instantaneous manner, because object localization data returned from object detection and tracking may be noisy. For example, when a third-party vehicle starts to move from a parked position, or when a vehicle that is expected to move forward begins instead to reverse, those small initial movements can be difficult to identify.

SUMMARY

A method for motion detection includes motion detection includes performing a first prediction to predict voxel occupancy based on a sequence of input point clouds including a current point cloud and a set of previous point clouds. A second prediction is performed to predict voxel occupancy for the sequence of input point clouds using predicted voxel occupancy between the input point clouds. Motion detection is performed based on the completed voxel occupancy. An action is performed responsive to a detected motion.

A system for motion detection includes a hardware processor and a memory that stores a computer program. When executed by the hardware processor, the computer program causes the hardware processor to perform a first prediction to predict voxel occupancy based on a sequence of input point clouds including a current point cloud and a set of previous point clouds, to perform a second prediction to predict voxel occupancy for the sequence of input point clouds using predicted voxel occupancy between the input point clouds, to perform motion detection based on the completed voxel occupancy, and to perform an action responsive to a detected motion.

An autonomous vehicle includes a light detection and ranging (LiDAR) sensor that captures a point cloud of a scene, a hardware processor, and a memory that stores a computer program. When executed by the hardware processor, the computer program causes the hardware processor to perform a first prediction to predict voxel occupancy based on a sequence of input point clouds from the LiDAR sensor, including a current point cloud and a set of previous point clouds, to perform a second prediction to predict voxel occupancy for the sequence of input point clouds using the predicted voxel occupancy between the input point clouds, to perform motion detection based on the completed voxel occupancy, and to perform steering, accelerating, or braking action responsive to a detected motion to avoid an object that is moving.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Using motion estimation for large-scale motions may degrade performance in the small-motion regime due to a decreased signal-to-noise ratio. Fine-grained small motion may therefore be treated with a separate framework to provide safe-critical operation, as such small motion often indicates a change of driving behavior or intention by other traffic participants. Such changes may be detected instantaneously, in a real-time manner, to provide an autonomous agent or advanced driving assistance system (ADAS) with information that can be used to react promptly, avoiding potential accidents.

An input sequence from a sensor, such as point clouds from a Light Detection And Ranging (LiDAR) sensor, may be combined with the output of an object detection/tracking system. Three-dimensional (3D) motion for each tracked object may be determined and those which are static or moving slowly may be identified. Point clouds may be extracted for each object and may be voxelized into a cubic occupancy grid. An encoder-decoder network classifies the object as to whether it is moving or stationary. If moving, 3D motion may be estimated.

Training this encoder-decoder network may be supervised by ground truth 3D motion derived from object 3D bounding box annotations. The network may further be trained for occupancy prediction as an auxiliary prediction task to facilitate the learning of small motion.

Figure 1:
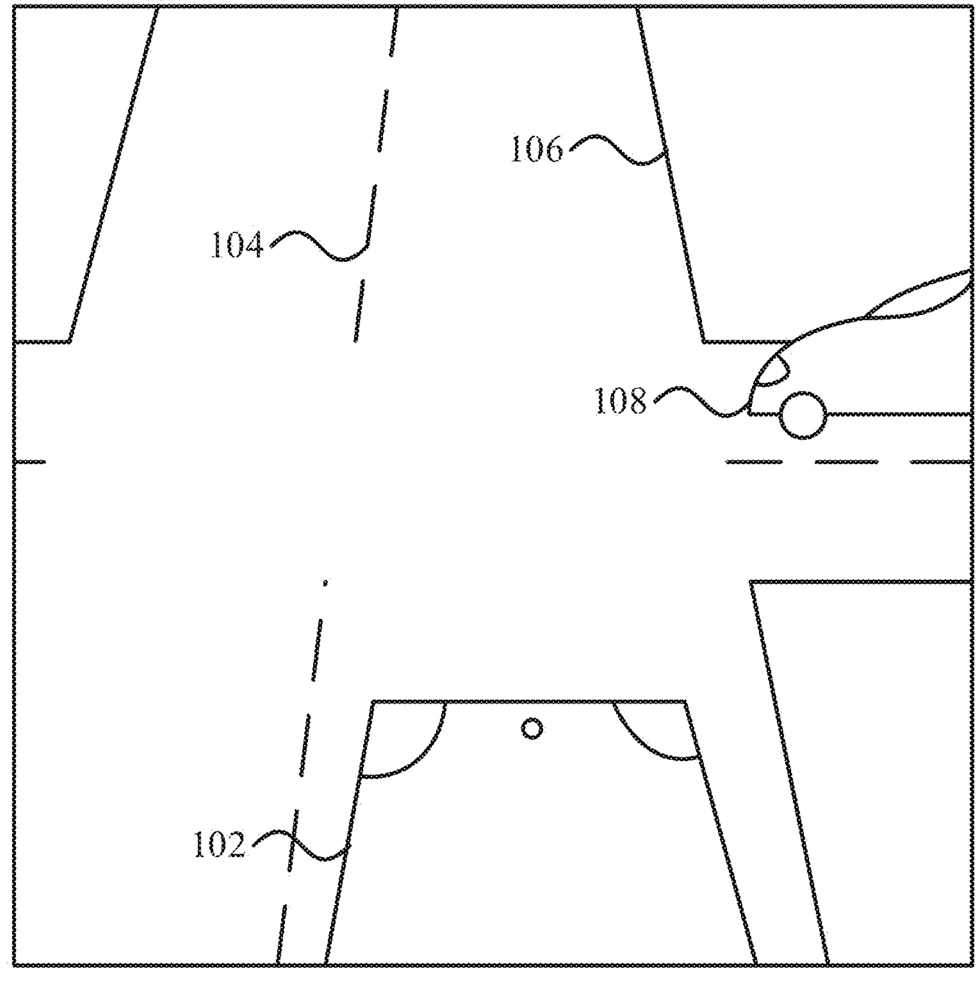
FIG. 1 is a diagram of a road scene around an autonomous vehicle, where small motion is detected and used to guide the autonomous vehicle, in accordance with an embodiment of the present invention.

Referring now to FIG. 1, an example scene is shown. The scene may be captured by one or more LiDAR sensors that are mounted on a vehicle 102, and may show the surroundings of the vehicle 102. It is particularly contemplated that the LiDAR sensors may generate a point cloud of the scene that they observe. In some cases multiple such LiDAR sensors to create a wide view of the scene around the vehicle 102.

The output of the LiDAR sensors may be used to identify and track different objects that are shown in the scene. The LiDAR output data shows a distance between the sensor and an object, which can be used to segment the scene into different objects, such as road boundaries 106 (e.g., curbs) and stationary objects as well as moving objects, such as other vehicles 108. Using this information, a navigation or self-driving system in the vehicle 102 can safely navigate through the scene. In some cases, the LiDAR information may be combined with visual information from cameras to provide additional sensing modalities for object detection and tracking.

Human drivers are adept at identifying moving objects in their environment and can use knowledge of the motion to predict and prevent collisions. While humans can detect even small motions with relative ease, the sensing systems that autonomous vehicles use to gather information about their environments are susceptible to noise, so that small motions can be hidden in the noise for a system that is optimized for large motion. The small motions are nonetheless significant for safe operation, as they indicate future hazards as parked vehicles start to move or as vehicles in a driving lane start to change direction. LiDAR sensors capture only a sparse set of points of the surrounding scene elements, and the pattern of points may vary depending on the relative position between the LiDAR sensor and the scene. As a result, there may be no point correspondences between frames with a moving LiDAR sensor, even for static scene elements. This implies that static objects may appear to be moving, an effect known as "swimming." This false swimming motion obfuscates the object's actual motion, particularly when the object is moving slowly or for short distances. As a result, a model that is trained for general motion detection may not perform as well for small motions.

To that end, a model can be used to learn shape completion before performing motion detection and estimation. Sequential frames of LiDAR point clouds from a short period of time can be used as input, and the accumulated LiDAR points from nearby frames are used to generate a denser occupancy grid, which is then applied as supervision for occupancy completion. This effectively densifies and enhances the surface cue to mitigate the impact of swimming.

To prevent noise, brought about by imperfect completion, from impacting the downstream motion estimation task, object shape completion may be performed locally for visible surface parts, where the major motion signals can be found. This approach is object-centric to keep latency low. Each object is treated individually by the models, which are trained in the regime of small motion. Such training data may be extracted from existing large-scale datasets, with the corresponding evaluation benchmarks being tailored for small motion.

Figure 2:
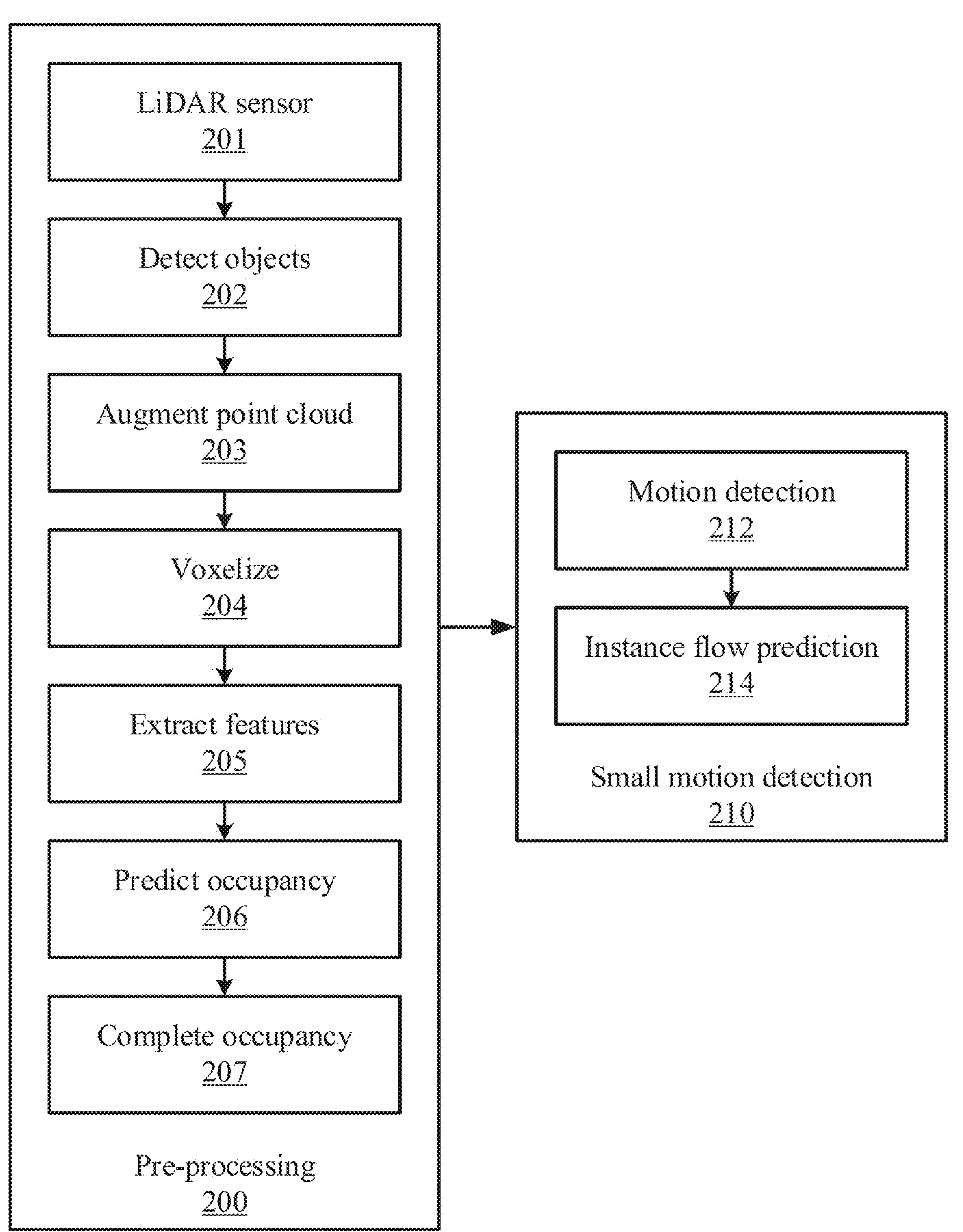
FIG. 2 is a block/flow diagram of a method for detecting small motion by combining point cloud data from multiple frames, in accordance with an embodiment of the present invention.

Referring now to FIG. 2, a diagram of small motion detection is shown. The sensor data is first pre-processed 200 before small motion detection 210 is performed. Sensor point clouds are drawn from LiDAR sensor 201, for example capturing a sequence (e.g., five) of frames of such point clouds within a short period of time. The sequence may include a set of past frames and one current frames. Pre-processing 200 filters out fast moving objects (e.g., those moving with a speed above a threshold value) as well as background points. For each remaining object, which may be static, slow-moving, or in transition between the two, its motion status may be predicted. An object may be detected soon after it begins to move, rather than after the object has been moving consistently for a long time, over a long trajectory.

Block 202 thus performs object detection using the sequence of point clouds, with the point clouds being augmented 203 to better define the detected objects. These point clouds may then be voxelized 204 to identify locations within the 3D space of the scene. An encoder-decoder model may be used to extract features 205 so that occupancy prediction 206 and occupancy completion 207 can be performed.

Thus voxelization 204 may take a point cloud $X_t \in \mathbb{R}^{N\times 3}$ at each frame as a binary grid of size $[W_x, W_y, W_z]$, with voxels containing LiDAR points being set to 1 and with other voxels being set to 0. This grid may be understood as an incomplete occupancy grid, in that it indicates part of the visible object surface captured by LiDAR at a single timestep. Consecutive frames may be stacked to form a spatial-temporal grid of size $[T, W_x, W_y, W_z]$.

Block 207 completes the occupancy. The sparse nature of LiDAR point clouds poses challenges for accurate small motion estimation due to small motions being combined with the swimming effect. To mitigate this issue, block 207 learns occupancy completion that effectively densifies the object surface to provide stronger cues for subsequent steps to reason about correspondence and, hence, motion between frames.

The occupancy completion 207 has a tradeoff in that the estimated occupancy completion may be imperfect, introducing additional noise. This may harm the final motion segmentation and estimation if the noise reaches a certain level, which could defeat the purpose of occupancy completion. While standard shape completion attempts to recover the entire object shape from a single-frame input, it is unnecessarily complicated and furthermore suffers from a lack of ground truth information in real driving scenes.

Instead, since the LiDAR frames collectively observe only a local part of the object within an instantaneous timeframe, occupancy completion 207 targets local features at the observed regions, while refraining from hallucinating areas invisible across the frames in the sequence. This way the signal for motion characterization is emphasized while extra noises from imperfect completions are minimized.

Occupancy completion 207 uses nearby frames to help densify the local occupancy grids. For each frame $F_t$, where $t \in [1, \ldots, T]$ in the input sequence, the LiDAR points from the other $T-1$ frames are warped to $F_t$ using the ground truth object motion, with ego-motion being factored out. In particular, the current frame $F_T$ may have the points from the previous frames warped to it. The corresponding voxels may then be marked as occupied. Points along the line of sight LiDAR rays are sampled before hitting the surface. These points are warped as well, with corresponding voxels being marked as empty or unoccupied. Points on the unknown space behind the surface are not sampled.

LiDAR frames outside the input sequence are not used. This concentrates learning on the local surface region visible to the input frames. Collectively, the empty and occupied voxels warped from the other T−1 frames are used as ground truth to supervise the local occupancy completion 207. No extra human annotations are incurred to generate this ground truth. In this manner the network is explicitly enforced to learn the notion of dense shape in an end-to-end manner, which facilitates the task of motion detection and estimation.

An encoder-decoder model may be used to extract features 205 from the voxelized point clouds and predict occupancy 206. The grid prediction may be passed to another encoder-decoder model for motion detection 212 and flow prediction 214. The motion detection 212 classifies the input object as being static of in motion, while flow prediction 214 estimates a motion vector for each voxel in the grid, from which motion flow for each input point can be extracted. No rigidity constraint is needed for the flow field. The decoder-encoder structures may include convolutional layers with skip connections. The height and temporal dimensions may be treated as the channel dimension, so that two-dimensional convolutional layers can be used for efficiency.

The encoder-decoder model may include an encoder with a sequence of convolutional layers to encode input data into a lower-dimensional feature space. A decoder may then reconstruct the occupancy grid from the encoded features. The output may be represented as a sigmoid-activated occupancy grid, predicting the presence or absence of object points for each voxel in all of the frames. For motion detection and flow estimation, the output of the occupancy grid prediction passes through another encoder-decoder to classify objects as being static or moving, generating a motion vector for each occupied voxel. This encoder extracts features from the occupancy grid and the subsequent decoder outputs motion segmentation and flow estimation. The final output has the predicted flow of each voxel and motion segmentation.

A binary cross-entropy loss can be used for occupancy grid prediction 206, a binary cross-entropy loss can be used for the static/moving object segmentation in motion detection 212, and an $L_2$ loss on motion flow estimation for moving targets in instance flow prediction 214. These losses may be summed to form a total loss function. Since the motion direction carries important information about driving intention, such as reversing or turning right/left, an angular loss may be used to minimize the angle between the predicted motion flow and its ground truth.

Figure 3:
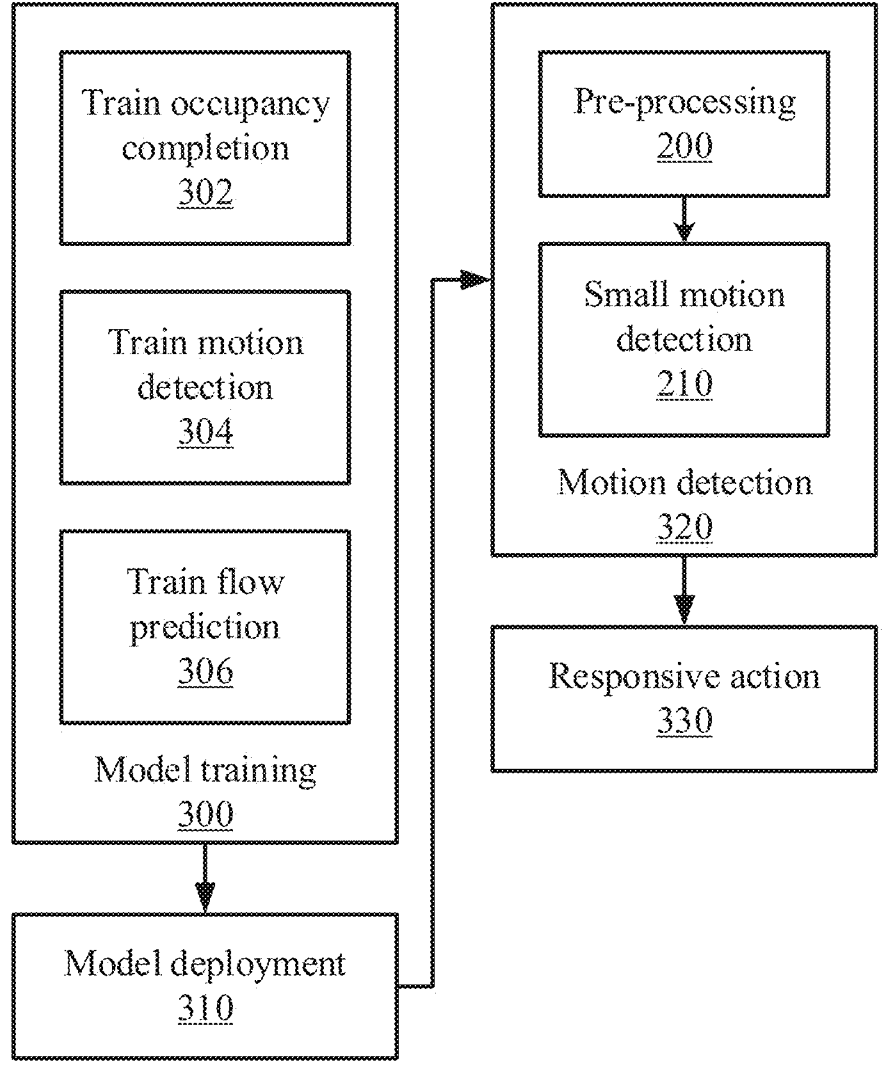
FIG. 3 is a block/flow diagram of a method for training and using a model to detect small motion, in accordance with an embodiment of the present invention.

Referring now to FIG. 3, a method for training and using a small motion detection model is shown. Block 300 performs model training, which includes training the occupancy completion model 302, training the motion detection model 304, and training the flow prediction model 306.

Once the models have been trained, they are deployed 310 to a system for execution. It is specifically contemplated that the system may be an autonomous vehicle, but it should be understood that the present embodiments may include any application that would benefit from identifying small motions. Motion detection 320 is then performed, which includes pre-processing 200 and small-motion detection 210. The motion detection 320 may further include detection of large-scale motions, for example using separately trained models that focus on larger movement of objects in a scene.

A responsive action 330 is performed based on the motion detection 320. For example, if small motion detection 210 indicates movement of an object within the scene that affects the expected path of an autonomous vehicle, then responsive action 330 may include altering the trajectory of the autonomous vehicle by a steering action, slowing the autonomous vehicle by a braking action, or speeding up the autonomous vehicle by an acceleration action.

Figure 4:
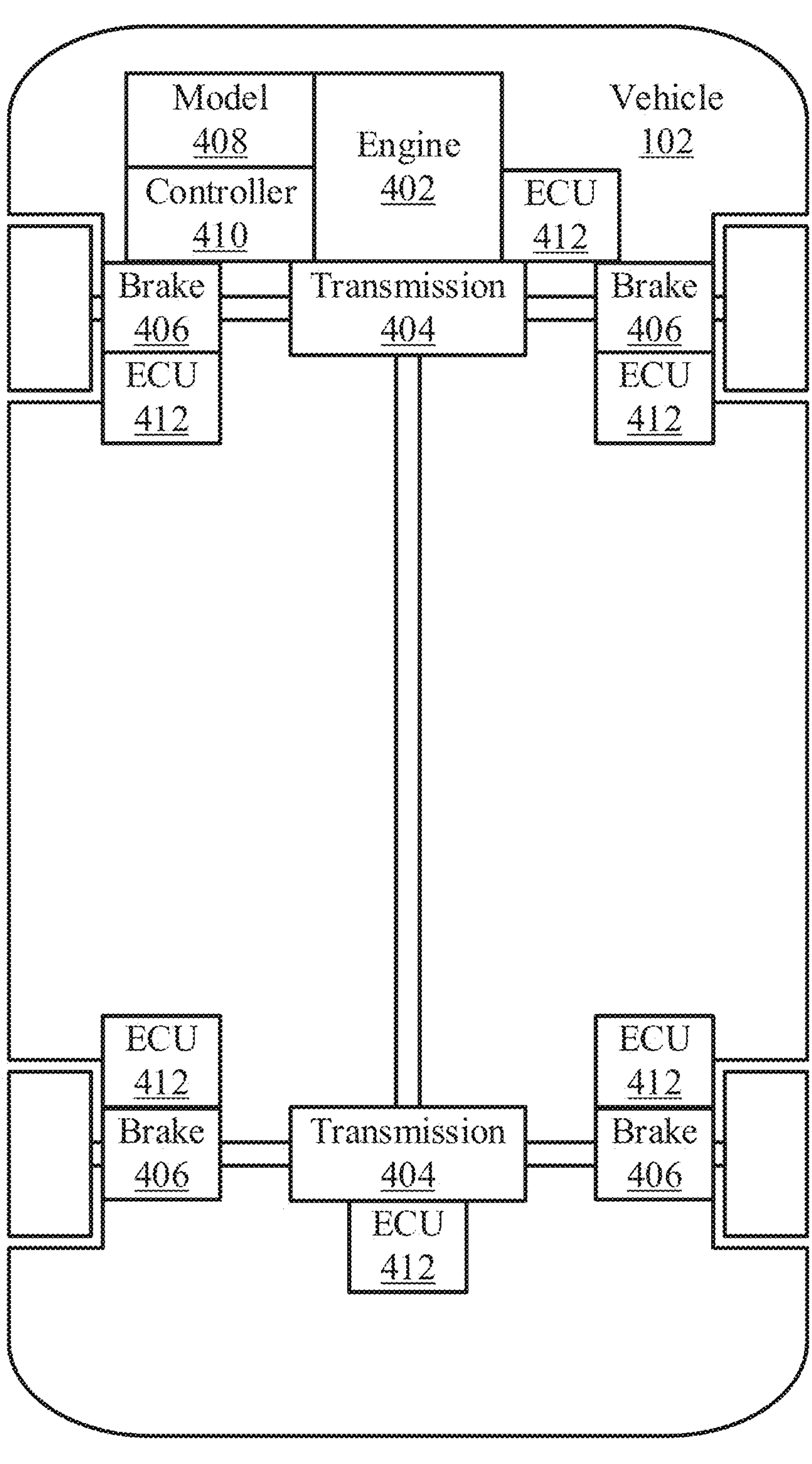
FIG. 4 is a diagram of an autonomous vehicle that can use small motion detection to automatically control its direction and speed, in accordance with an embodiment of the present invention.

Referring now to FIG. 4, additional detail on a vehicle 102 is shown. A number of different sub-systems of the vehicle 102 are shown, including an engine 402, a transmission 404, and brakes 406. It should be understood that these sub-systems are provided for the sake of illustration, and should not be interpreted as limiting. Additional sub-systems may include user-facing systems, such as climate control, user interface, steering control, and braking control. Additional sub-systems may include systems that the user does not directly interact with, such as tire pressure monitoring, location sensing, collision detection and avoidance, and self-driving.

Each sub-system is controlled by one or more equipment control units (ECUs) 412, which perform measurements of the state of the respective sub-system. For example, ECUs 412 relating to the brakes 406 may control an amount of pressure that is applied by the brakes 406. An ECU 412 associated with the wheels may further control the direction of the wheels. The information that is gathered by the ECUs 412 is supplied to the controller 410.

Communications between ECUs 412 and the sub-systems of the vehicle 102 may be conveyed by any appropriate wired or wireless communications medium and protocol. For example, a car area network (CAN) may be used for communication. The time series information may be communicated from the ECUs 412 to the controller 410, and instructions from the controller 410 may be communicated to the respective sub-systems of the vehicle 102.

The controller 410 uses the output of the small motion detection 210, based on information collected from cameras, to identify the likely small motion of objects within the scene. The model 408 may, for example, determine that a vehicle in the scene is beginning to move, or to change its direction, in a manner that will interfere with the expected path of the vehicle 102.

The controller 410 may communicate internally, to the sub-systems of the vehicle 102 and the ECUs 412. Based on detected road fault information, the controller 410 may communicate instructions to the ECUs 412 to avoid a vehicle that has begun moving. For example, the controller 410 may automatically trigger the brakes 406 to slow down the vehicle 102 and may furthermore provide steering information to the wheels to cause the vehicle 102 to take a path around the expected path of the vehicle.

Figure 5:
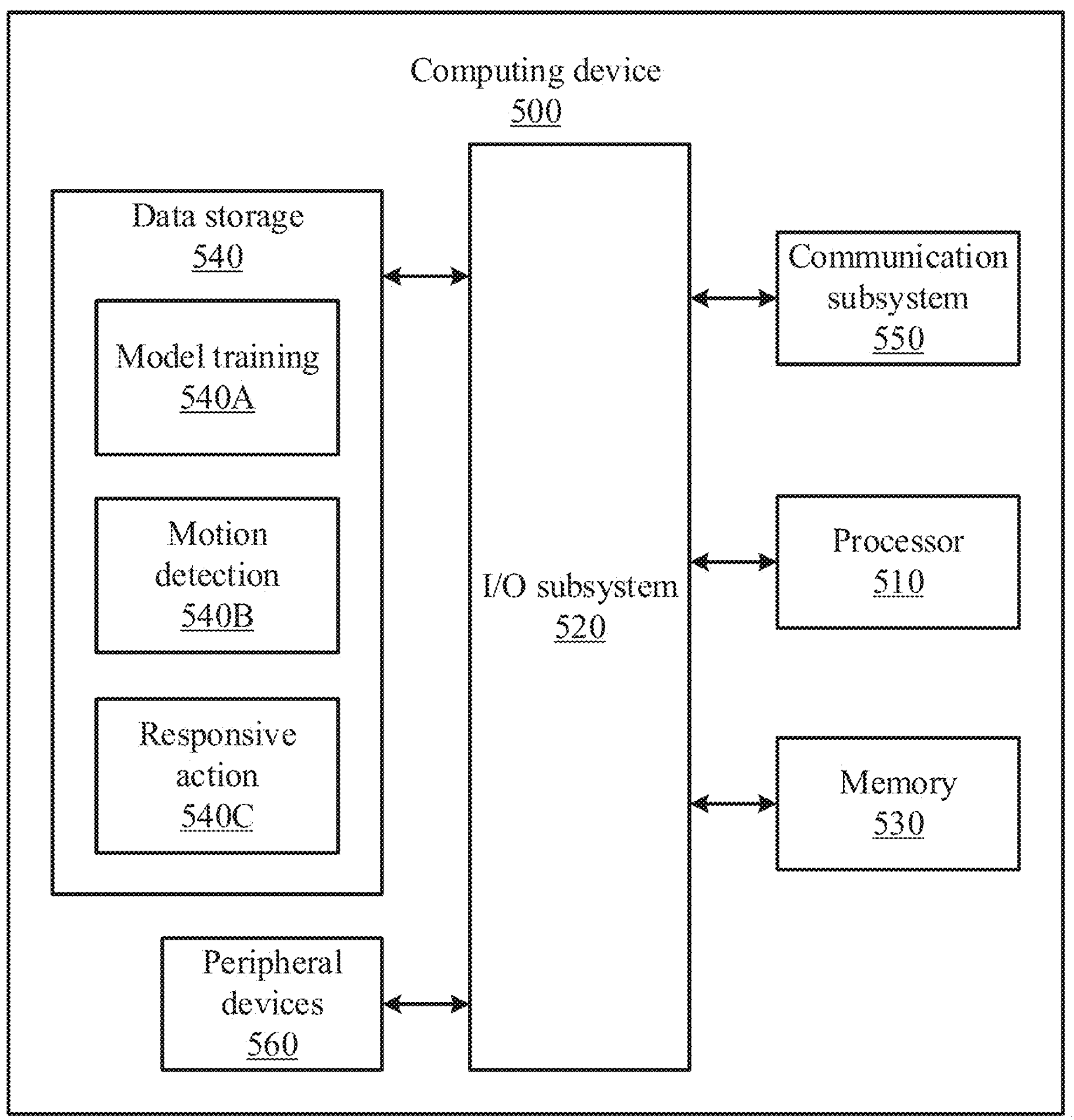
FIG. 5 is a block diagram of a computing device that can train and use a model for motion detection, in accordance with an embodiment of the present invention.

Referring now to FIG. 5, an exemplary computing device 500 is shown, in accordance with an embodiment of the present invention. The computing device 500 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 500 may be embodied as one or more compute sleds, memory sleds, or other racks, sleds, computing chassis, or other components of a physically disaggregated computing device.

As shown in FIG. 5, the computing device 500 illustratively includes the processor 510, an input/output subsystem 520, a memory 530, a data storage device 540, and a communication subsystem 550, and/or other components and devices commonly found in a server or similar computing device. The computing device 500 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 530, or portions thereof, may be incorporated in the processor 510 in some embodiments.

The processor 510 may be embodied as any type of processor capable of performing the functions described herein. The processor 510 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 530 may be embodied as any type of volatile or non-volatile memory or data storage capable of performing the functions described herein. In operation, the memory 530 may store various data and software used during operation of the computing device 500, such as operating systems, applications, programs, libraries, and drivers. The memory 530 is communicatively coupled to the processor 510 via the I/O subsystem 520, which may be embodied as circuitry and/or components to facilitate input/output operations with the processor 510, the memory 530, and other components of the computing device 500. For example, the I/O subsystem 520 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 520 may form a portion of a system-on-a-chip (SOC) and be incorporated, along with the processor 510, the memory 530, and other components of the computing device 500, on a single integrated circuit chip.

The data storage device 540 may be embodied as any type of device or devices configured for short-term or long-term storage of data such as, for example, memory devices and circuits, memory cards, hard disk drives, solid state drives, or other data storage devices. The data storage device 540 can store program code 540A for training a model, 540B for performing motion detection, and/or 540C for performing an automatic action a detected road fault. Any or all of these program code blocks may be included in a given computing system. The communication subsystem 550 of the computing device 500 may be embodied as any network interface controller or other communication circuit, device, or collection thereof, capable of enabling communications between the computing device 500 and other remote devices over a network. The communication subsystem 550 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 500 may also include one or more peripheral devices 560. The peripheral devices 560 may include any number of additional input/output devices, interface devices, and/or other peripheral devices. For example, in some embodiments, the peripheral devices 560 may include a display, touch screen, graphics circuitry, keyboard, mouse, speaker system, microphone, network interface, and/or other input/output devices, interface devices, and/or peripheral devices.

Of course, the computing device 500 may also include other elements (not shown), as readily contemplated by one of skill in the art, as well as omit certain elements. For example, various other sensors, input devices, and/or output devices can be included in computing device 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 500 are readily contemplated by one of ordinary skill in the art given the teachings of the present invention provided herein.

Figure 6:
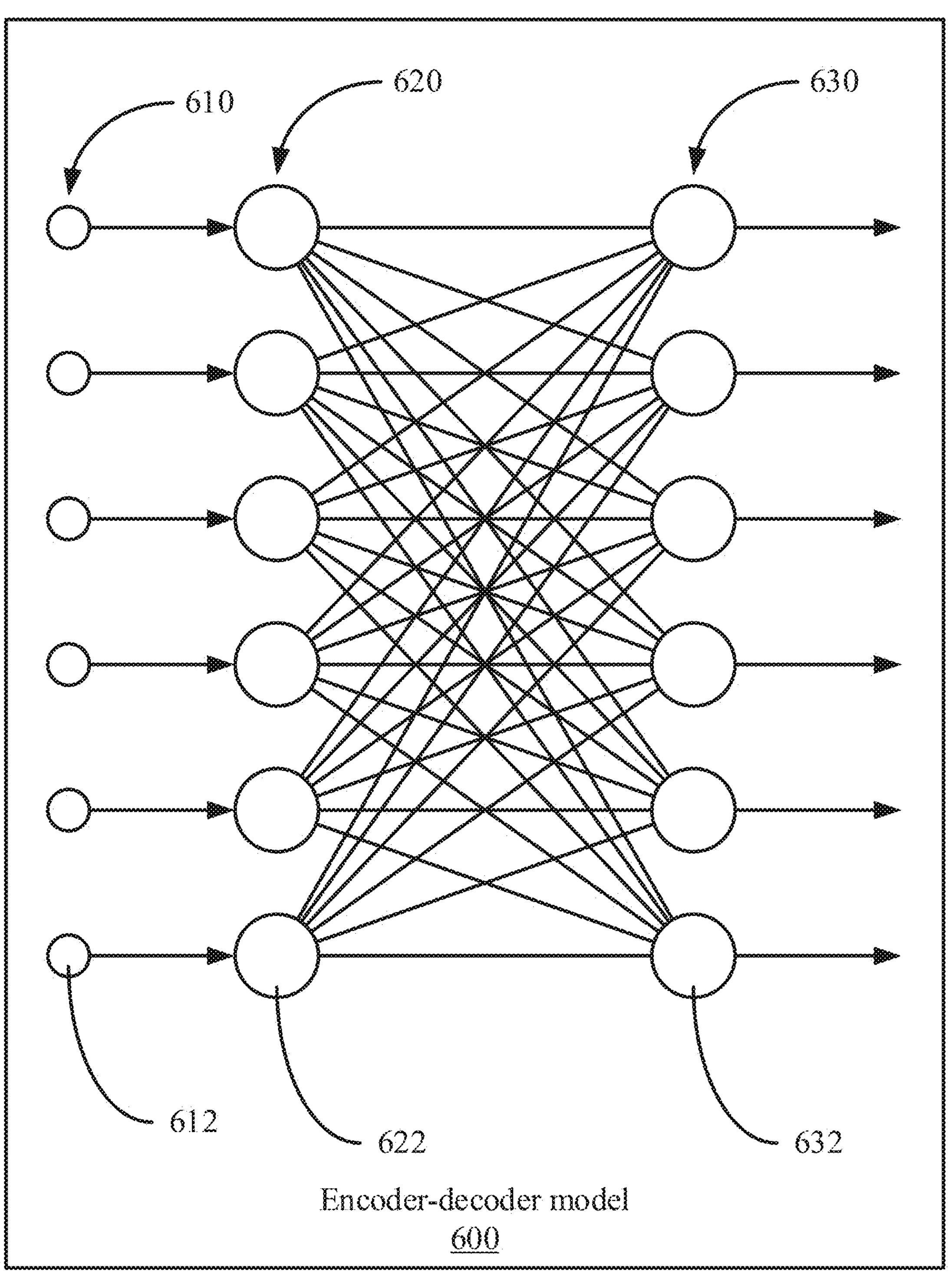
FIG. 6 is a diagram of an exemplary neural network architecture that can be used as part of an encoder-decoder model, in accordance with an embodiment of the present invention.
Figure 7:
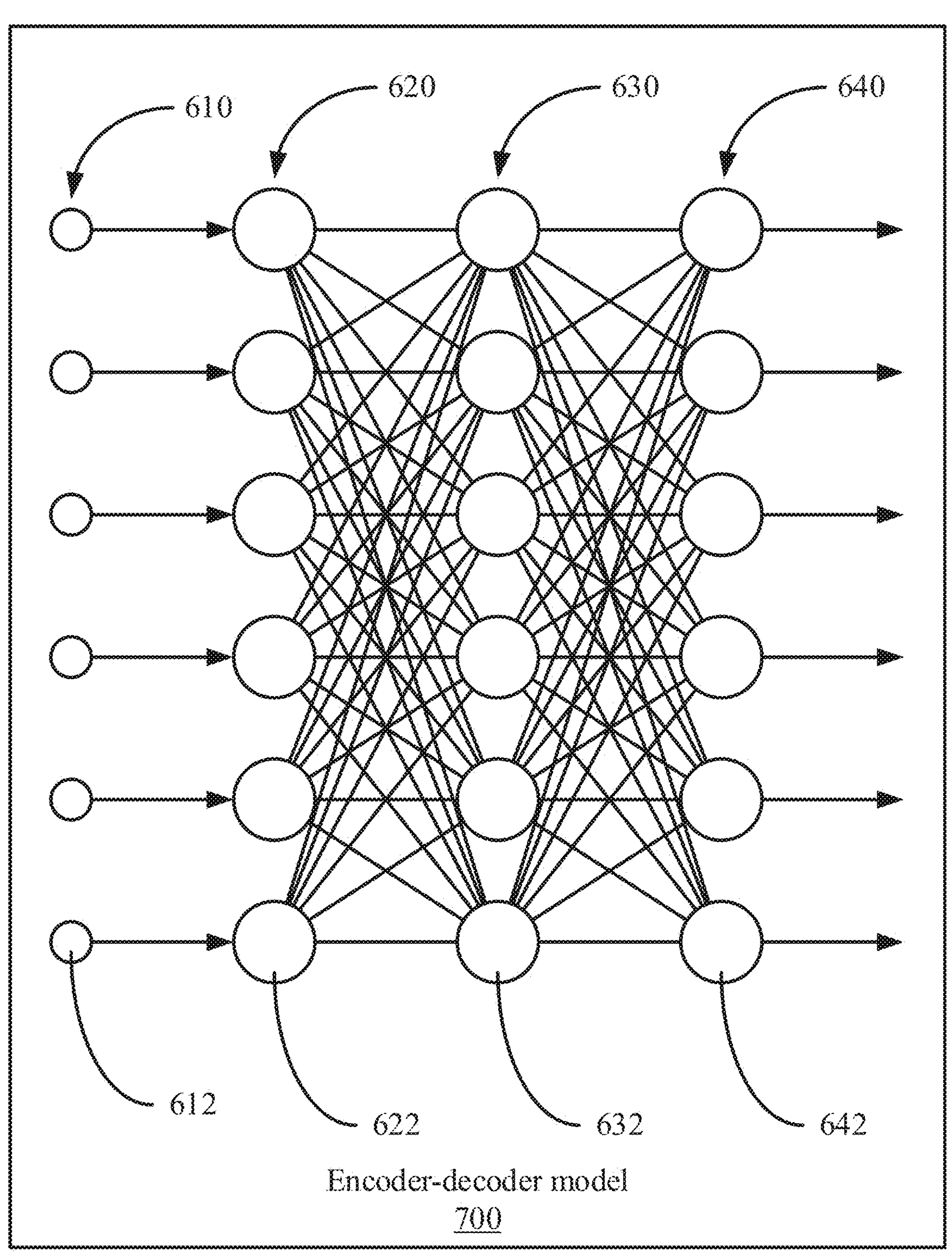
FIG. 7 is a diagram of an exemplary deep neural network architecture that can be used as part of an encoder-decoder model, in accordance with an embodiment of the present invention.

Referring now to FIGS. 6 and 7, exemplary neural network architectures are shown, which may be used to implement parts of the present models, such as the encoder/decoder models 600/700. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the input data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 620 of source nodes 622, and a single computation layer 630 having one or more computation nodes 632 that also act as output nodes, where there is a single computation node 632 for each possible category into which the input example could be classified. An input layer 620 can have a number of source nodes 622 equal to the number of data values 612 in the input data 610. The data values 612 in the input data 610 can be represented as a column vector. Each computation node 632 in the computation layer 630 generates a linear combination of weighted values from the input data 610 fed into input nodes 620, and applies a non-linear activation function that is differentiable to the sum. The exemplary simple neural network can perform classification on linearly separable examples (e.g., patterns).

A deep neural network, such as a multilayer perceptron, can have an input layer 620 of source nodes 622, one or more computation layer(s) 630 having one or more computation nodes 632, and an output layer 640, where there is a single output node 642 for each possible category into which the input example could be classified. An input layer 620 can have a number of source nodes 622 equal to the number of data values 612 in the input data 610. The computation nodes 632 in the computation layer(s) 630 can also be referred to as hidden layers, because they are between the source nodes 622 and output node(s) 642 and are not directly observed. Each node 632, 642 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 632 in the one or more computation (hidden) layer(s) 630 perform a nonlinear transformation on the input data 612 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for motion detection, comprising:

predicting voxel occupancy based on a sequence of input point clouds including a current point cloud and a set of previous point clouds;

completing the voxel occupancy of the current point cloud to densify an object surface by warping the predicted voxel occupancy from the set of previous point clouds using object motion with ego-motion being factored out;

performing motion detection based on the completed voxel occupancy; and performing an action responsive to a detected motion.

2. The method of claim 1, further comprising performing flow prediction based on the motion detection.

3. The method of claim 1, further comprising detecting objects within the sequence of input point clouds.

4. The method of claim 3, further comprising determining whether the detected objects are static or in motion using an encoder-decoder model.

5. The method of claim 3, further comprising filtering out background objects and objects that are moving with a speed greater than a threshold value.

6. The method of claim 1, wherein completing the voxel occupancy includes completing occupancy for only those surfaces which are visible.

7. The method of claim 1, wherein warping the predicted voxel occupancy includes setting occupied voxel from the set of previous point clouds as occupied in the current point cloud.

8. The method of claim 7, wherein warping the predicted voxel occupancy includes setting voxels along a line of sight to the occupied voxel as unoccupied in the current point cloud.

9. The method of claim 1, wherein the action controls an autonomous vehicle to avoid an object that is moving.

10. The method of claim 9, wherein controlling the autonomous vehicle includes performing a steering, accelerating, or braking action.

11. A system for motion detection, comprising:

a hardware processor; and a memory that stores a computer program which, when executed by the hardware processor, causes the hardware processor to:

predict voxel occupancy based on a sequence of input point clouds including a current point cloud and a set of previous point clouds;

complete the voxel occupancy of the current point cloud to densify an object surface by warping the predicted voxel occupancy from the set of previous point clouds using object motion with ego-motion being factored out;

perform motion detection based on the completed voxel occupancy; and perform an action responsive to a detected motion.

12. The system of claim 11, wherein the computer program further causes the hardware processor to perform flow prediction based on the motion detection.

13. The system of claim 11, wherein the computer program further causes the hardware processor to detect objects within the sequence of input point clouds.

14. The system of claim 13, wherein the computer program further causes the hardware processor to determine whether the detected objects are static or in motion using an encoder-decoder model.

15. The system of claim 13, wherein the computer program further causes the hardware processor to filter out background objects and objects that are moving with a speed greater than a threshold value.

16. The system of claim 11, wherein the computer program further causes the hardware processor to complete the voxel occupancy includes completing occupancy for only those surfaces which are visible.

17. The system of claim 11, wherein the computer program further causes the hardware processor to set occupied voxel from the set of previous point clouds as occupied in the current point cloud.

18. The system of claim 17, wherein the computer program further causes the hardware processor to set voxels along a line of sight to the occupied voxel as unoccupied in the current point cloud.

19. The system of claim 11, wherein the action controls an autonomous vehicle to avoid an object that is moving with a steering, accelerating, or braking action.

20. An autonomous vehicle, comprising:

a light detection and ranging (LIDAR) sensor that captures a point cloud of a scene;

a hardware processor; and a memory that stores a computer program which, when executed by the hardware processor, causes the hardware processor to;

predict voxel occupancy based on a sequence of input point clouds from the LIDAR sensor, including a current point cloud and a set of previous point clouds;

complete the voxel occupancy of the current point cloud to densify an object surface by warping the predicted voxel occupancy from the set of previous point clouds using object motion with ego-motion being factored out;

perform motion detection based on the completed voxel occupancy; and perform steering, accelerating, or braking action responsive to a detected motion to avoid an object that is moving.

* * * * *